Jan. 15, 1946.  P. WILLIAMS  2,393,210
MAKING SHOE SOLE TAPS
Filed Jan. 21, 1944  4 Sheets-Sheet 2
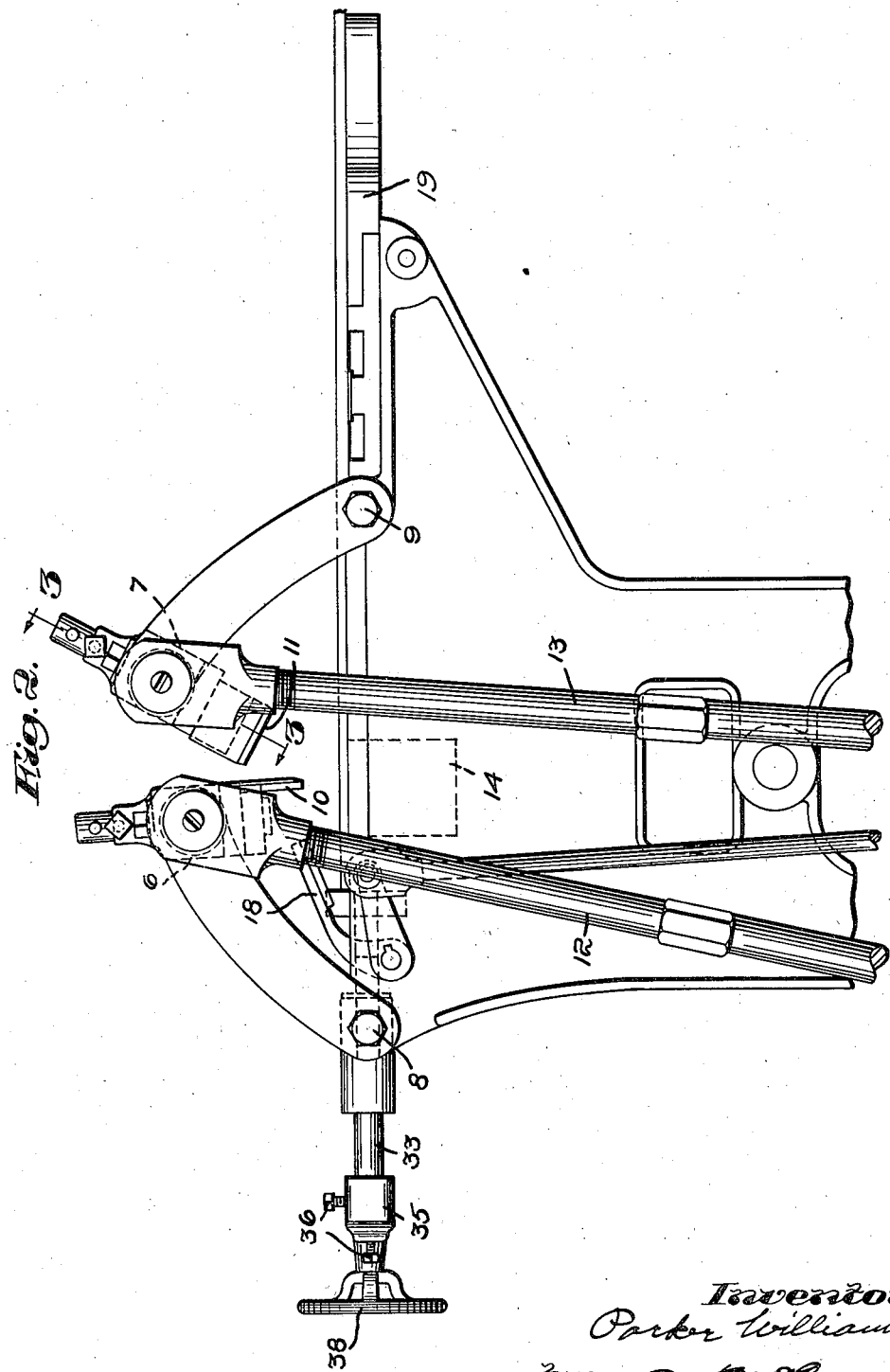
Inventor:
Parker Williams,
by J. H. McCurdy,
Attorney.

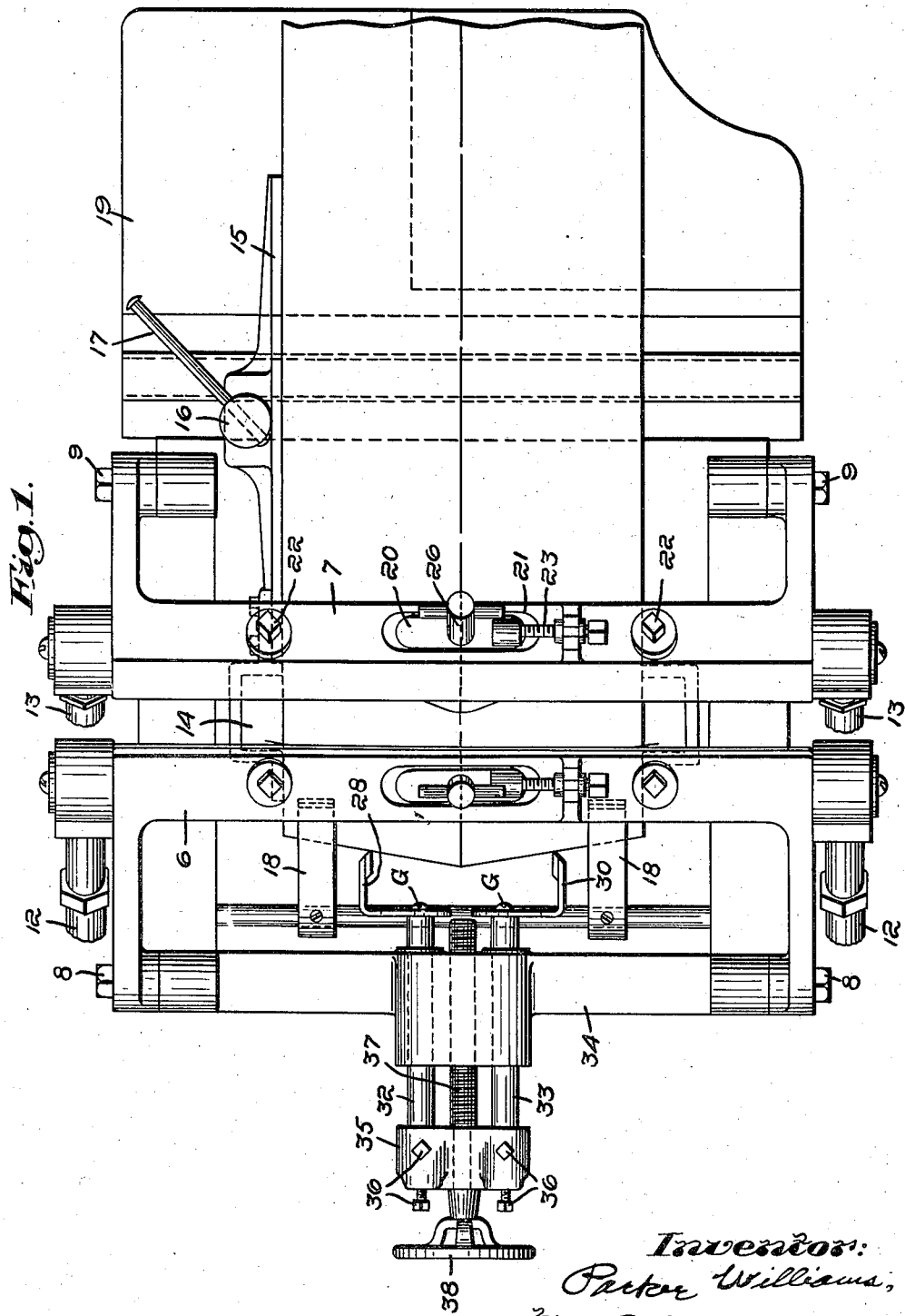

Jan. 15, 1946.                P. WILLIAMS                2,393,210
                         MAKING SHOE SOLE TAPS
                         Filed Jan. 21, 1944            4 Sheets-Sheet 3
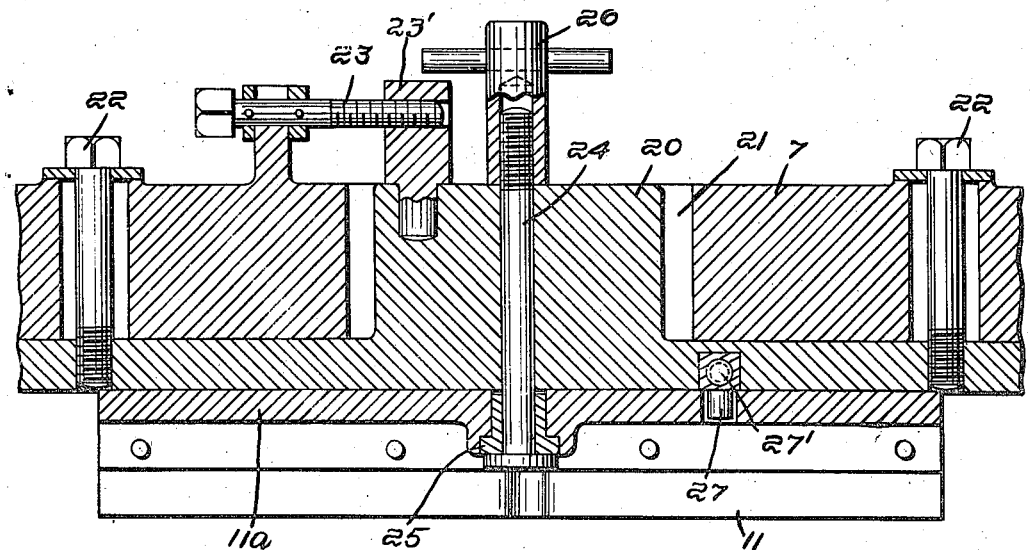
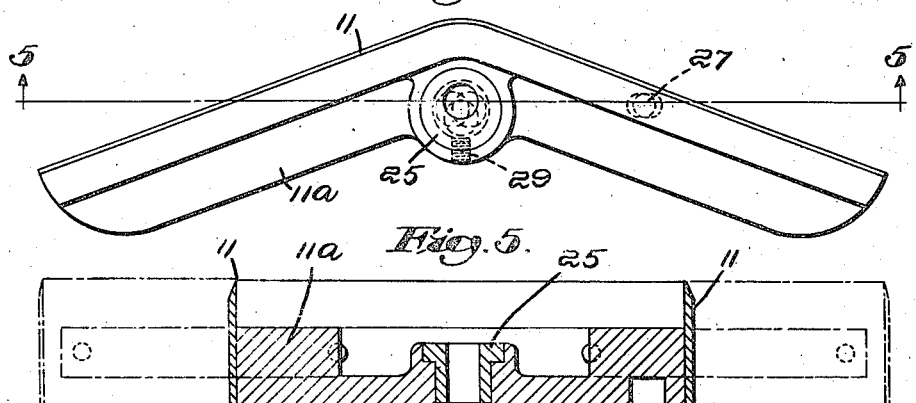
Inventor:
Parker Williams,
by J. H. McCurdy,
Attorney.

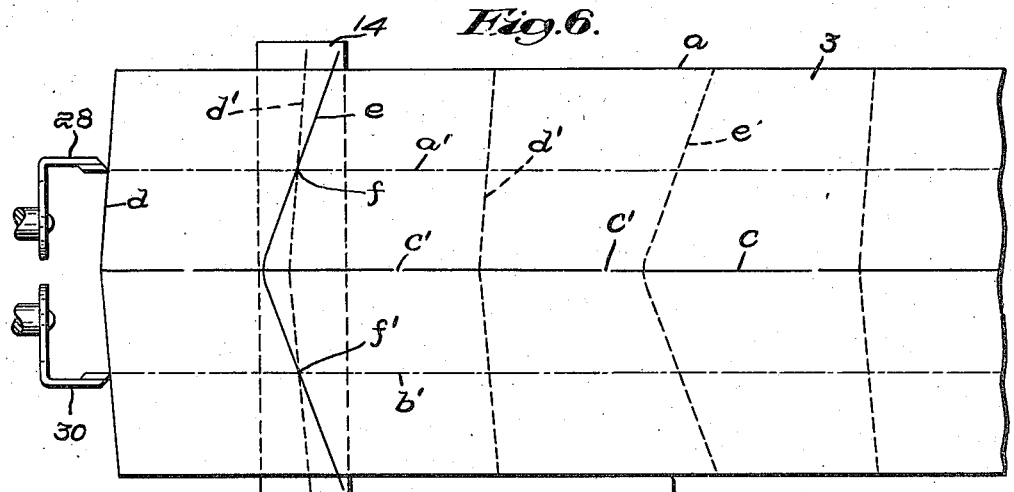
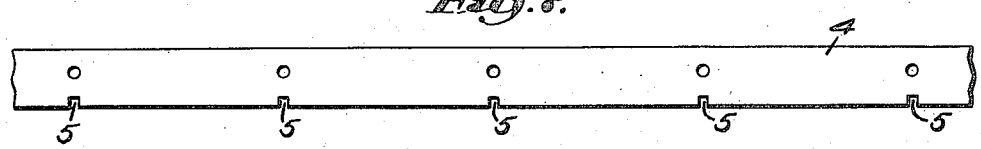
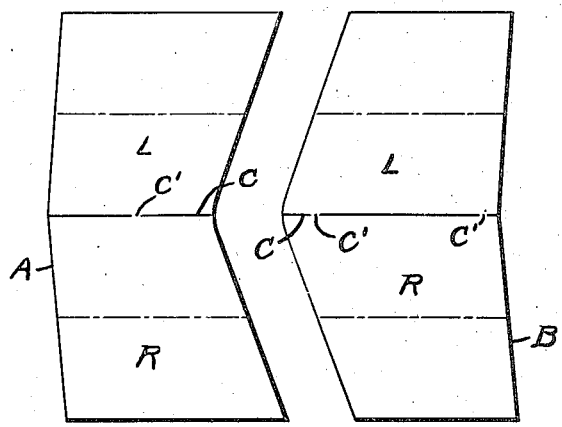
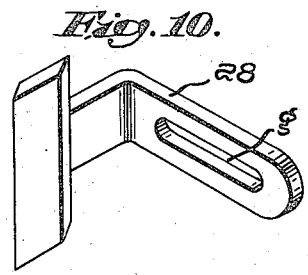
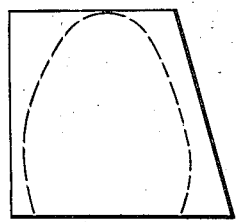

Patented Jan. 15, 1946

2,393,210

UNITED STATES PATENT OFFICE 2,393,210

MAKING SHOE SOLE TAPS

Parker Williams, Weston, Mass., assignor to Williams Cut Sole Co., Boston, Mass., a corporation of Massachusetts Application January 21, 1944, Serial No. 519,110

9 Claims. (Cl. 12—146)

This invention relates to the manufacture of shoe sole taps of the so-called "angle" type. This type of tap has front and rear straight edges approximately parallel to each other, and side edges which are inclined at different angles to said front and rear edges so as to approximate the inclination of the inner and outer edges of the forepart of a shoe sole. Naturally these angles in a left tap are inclined oppositely to those for a right tap.

The customary method of cutting such taps is to strip sole leather into suitable widths for the particular size of tap to be made, the width of the strip being equal to the length of the tap, and then to cut across this strip at suitable angles to produce either right or left taps, depending upon the angle at which the knives are set.

Competition in this line is so keen that a saving of even, say, one-tenth of a cent per pair of taps, is a very important matter to the manufacturer of these goods. The present invention aims to improve the methods of cutting angle taps.

The nature of the invention will be readily understood from the following description when read in connection with the accompanying drawings, and the novel features will be particularly pointed out in the appended claims.

In the drawings,

Fig. 1 is a plan view of a sole cutting machine of a common form but modified in accordance with this invention;

Fig. 2 is a side elevation of the upper part of the machine shown in Fig. 1;

Fig. 3 is a sectional view through the knife holder, this section being taken on the line 3—3, Fig. 2;

Fig. 4 is a plan view of a cutting knife provided by this invention;

Fig. 5 is a vertical, sectional view on the line 5—5, Fig. 4;

Fig. 6 is a plan view illustrating a step in the novel method of this invention;

Fig. 7 is a side view of a knife used in performing one of the operations of this method;

Figs. 8 and 9 are plan views of the articles cut from the sole leather strip shown in Fig. 6;

Fig. 10 is a perspective view of one of the gauges shown in Figs. 1 and 6; and

Fig. 11 is a plan view of a typical angle tap.

Referring first to Fig. 11, the tap there shown is like the common commercial article which has long been on the market. This is a right tap and the final product made from it has a shape like the forepart of a right shoe sole, substantially as indicated in dotted lines in said figure.

According to the method of this invention sole leather is cut into strips 3, like that shown in Fig. 6, having opposite parallel edges $a$ and $b$, each strip being of a width equal to the combined length of a right and left tap positioned end to end. This strip next is cut along an intermediate line C, parallel to and equally spaced from the outer edges $a$ and $b$, to substantially divide the strip into two equal sections, while still leaving these sections connected together sufficiently to enable the entire strip to be handled efficiently. Preferably this cutting operation is performed in a stripper with a knife like that shown at 4 in Fig. 7, the cutting edge of the knife being notched at intervals, as indicated at 5, so that when it cuts through the strip 3 it will leave uncut portions or ligaments $c'$ serving to connect and hold the two sections together.

Next, transverse V-shaped cuts are made entirely across the strip 3, the first cut being made at $d$, Fig. 6, to produce an end of suitable shape on the strip and the next cut being made at $e$, the latter cut being at a sharper angle than the first cut. And these operations are repeated, as shown at $d'$ and $e'$, and so on, one cut alternating with another to the end of the entire strip.

Sole leather sections so produced are shown at A and B in Figs. 8 and 9. It will be observed that the section A contains two angle taps. If we assume that the grain side of the leather is down, then the lower one will be a right and the other a left. In section A the two taps are positioned toe to toe, while in the other section they are located heel to heel.

Thus, by this method, a pair of right and left taps are produced at each cut following the first one. The two taps in each section may or may not be connected together by the uncut portions $c'$, depending on the spacing of these connecting points. If they are so connected then they may be easily separated simply by bending the two sections along the middle line of cut C.

This method may be conveniently practiced on a production basis by making some modifications in the cutting machine known commercially as the Knox sole cutter shown in Patent No. 1,191,344, dated July 18, 1916. This machine is well known in the cut sole trade and requires no description except to point out that it comprises two cutter heads or beams 6 and 7, respectively, Figs. 1 and 2, pivoted on the machine frame at 8 and 9 and carrying two knives 10 and 11, respectively. The beams are operated by connecting rods 12 and 13 running to eccentrics on a shaft located in the base of the machine frame, so that the beams are swung about their respective pivots 8 and 9 to bring the cutting edges of their respective knives 10 and 11 alternately down into contact with the upper surface of the cutting block 14.

The strip of sole leather to be cut is fed to the cutting block across the upper surface of a flat table 19 and is guided by one edge running in contact with a guide plate 15. The latter is adjustable transversely in a direction parallel with the beams and is clamped in its adjusted position by the bolt 16 provided with a handle 17.

In using the machine in the customary manner the strip of sole leather is fed by hand across the table 14 and the cutting block until its forward edge strikes a stop. Assuming that the machine is running, a pair of ejecting arms 18 strike the end that has been severed by the first cut and knock it down, the operator continuing to feed the stock forward as rapidly as he is allowed to by the action of the knives. The feed, of course, takes place only between cuts, and these operations are continued until the entire strip has been worked up. At all times the edge of the strip is guided against the side gauge 15.

So far as the construction and operations above described are concerned, they are like those of the regular commercial machine.

For the purposes of this invention, however, the customary knives are replaced with special angular knives adapted to make the cuts d and e, Fig. 6. One of these knives is shown at 11 in Figs. 3, 4 and 5. It has a sturdy frame or body 11a and a cutting knife or blade 11 secured to it. This particular knife is intended to make the cut e, Fig. 6, but the other knife is like it except that it has a flatter angle adapted to make the cut d.

For the purpose of mounting the knife on the beam 7 a holder 20 or "internal beam," so called, Figs. 1 and 3, is provided, this holder being of an inverted T-shape with the stem or shank of the T located in a slot 21 formed in the beam 7, and the bar of the T being pulled up snugly against the bottom of the beam by bolts 22—22, Figs. 1 and 3. These bolts project through slots in the beam, as clearly shown in Fig. 3, and the entire holder may be adjusted lengthwise of the beam by the adjusting bolt 23 which has a rotative relation only to the beam but is screw-threaded into a block 23' set into the holder 20.

The knife is clamped to the bottom of the holder by a bolt 24, Fig. 3, which passes freely through the holder 20, while the bolt head on its lower end bears against the lower end of a bushing 25 set into the frame 11a of a knife assembly or cutter unit. The stem of the bolt passes through this bushing and a T-shaped nut 26 is threaded on the upper end of the bolt and bears against the upper surface of the part 20 so that by turning up this nut the knife frame is pulled up securely against the bottom of the holder 20.

It is important to have the two knives that make the cuts d and e set so that these cuts d' and e, Fig. 6, as shown immediately above the cutting block indicated diagrammatically at 14, will intersect each other exactly in the median lines a' and b' of the two strips partly separated by the cut C. For this reason means is provided for adjusting the relative distance between the knives so that, no matter what size tap is cut, the intersections of the two knives will always come in the two median lines just referred to. As shown in Figs. 3 and 4, the bushing 25 has an eccentric hole for the passage of the bolt 24 so that by turning this bushing the knife frame is moved forward or backward. A pin 27, Figs. 3 and 4, which projects downwardly from the internal beam 20 can also be adjusted by means of a screw 27', with which the Knox machine customarily is equipped, so that the net result of the two adjustments is to move the knife backward or forward by the necessary amount to make the two knives cut on the same center line, as indicated in Fig. 6 at d' and e. By the "center line" is meant a straight line through the intersecting points f and f', Fig. 6, and at right angles to the side edges a and b. The bushing is locked in its adjusted position by a set screw 29.

Thus, with this arrangement, the center line of one of the knives can be adjusted so that it will coincide with that of the other. This is important in setting the machine to cut taps of different sizes, as any change in the length of the tap causes a consequent change in the center line of that tap, as indicated at a' or b' in Fig. 6.

The extent of the feeding movement of the leather strip 3 between successive cuts must be equal to the average width of the taps. This width is measured along the median line a' and b', Fig. 6, which, of course, is spaced from the outer guiding edges a and b by a distance equal to one-quarter of the over-all width of the strip 3. For this purpose gauging devices or stops 28 and 30, Figs. 1 and 6, are provided to engage the forward end of the strip 3 exactly at the ends of the lines a' and b' and they are so adjusted that the distance which the strip is fed between successive cuts will always be exactly the desired value. These stop devices 28 and 30 are like that shown in Fig. 10, and they are secured to the forward ends of guide rods 32 and 33, respectively, Fig. 1, both slidable through the central portion of a bar 34 which forms part of the machine frame. A yoke 35 connects these rods and permits one to be adjusted relatively to the other by means of set screws 36. This yoke carries an adjusting screw 37, provided with a hand wheel 38, which rotates freely in the yoke but is threaded into the bar 34. The stops 28 and 30 are slotted, as indicated at g in Fig. 10, to receive fastening screws or bolts G, Fig. 1, by means of which they are secured to the rods 32 and 33. Thus the stops 28 and 30 can readily be adjusted toward and from each other and also toward and from the path of travel of the material to be cut.

It will be seen from the foregoing that this invention effects an important economy in the manufacture of angle taps. As compared with the old method it substantially doubles the rate of production with only a very trifling, if any, increase in the expense of preparation of the sole leather for the cutting step. In this connection it may be pointed out that while the stock from which the taps are cut has been referred to as "sole leather," since this is the material more commonly used for this purpose, the invention is equally useful in making taps of this kind from other types of shoe sole material. Consequently, the term "sole leather" or "leather," as herein used in the specification and claims is intended to include other forms of outsole stock. Also, by the term "a pair of right and left taps" I mean a right and a left tap as shown, for example, in Fig. 8 or in Fig. 9.

It is obvious that the method herein disclosed can be performed by hand, or with the aid of machinery of other forms than that illustrated. No claim is here made to the machine disclosed in this application, but this feature of applicant's invention forms the subject matter of a divisional application Ser. No. 567,204, filed Dec. 8, 1944.

Having thus described my invention, what I desire to claim as new is:

1. That improvement in methods of cutting angle sole taps from sole leather, comprising the steps of providing a strip of sole leather of a width equal to the over-all width of a pair of right and left taps positioned edge to edge, preliminarily cutting said strip lengthwise to partially divide it into two longitudinal sections from each of which taps can be cut, and then making successive cuts across said strip transversely, so spaced and at such angles as to cut pairs of right and left taps simultaneously from the strip at each cut.

2. That improvement in methods of cutting angle sole taps from sole leather, comprising the steps of providing a strip of sole leather of a width equal to the over-all width of a pair of right and left taps positioned edge to edge, cutting transversely across said strip at points so spaced lengthwise thereof as to cut from it a pair of combined right and left sections at each cut, and preliminarily dividing said strip lengthwise to such a degree that no cutting operation on said sections will be necessary to separate the taps of each section after they have been severed from said strip.

3. That improvement in methods of cutting angle sole taps from sole leather, comprising the steps of providing a strip of sole leather of a width equal to the over-all width of a pair of right and left taps positioned edge to edge, cutting transversely across said strip at points so spaced lengthwise thereof as to cut from it a pair of combined right and left sections at each cut, and making the angles of said cuts such that the taps in one section will be positioned toe to toe and those of the next section will be located heel to heel.

4. That improvement in methods of cutting angle sole taps from sole leather, comprising the steps of providing a strip of leather having parallel straight side edges, said strip being of a width equal to the length of a pair of right and left taps positioned end to end, and making transverse cuts completely across said strip at such angles and so spaced lengthwise of the strip as to produce successive pairs of right and left taps with the individuals of one pair positioned toe to toe and those of the next pair located heel to heel.

5. That improvement in methods of cutting angle sole taps from sole leather, comprising the steps of providing a strip of sole leather of a width equal to the over-all width of a pair of right and left taps positioned end to end, said strip being substantially divided lengthwise into two longitudinal sections from which the respective individual taps of each pair may be cut, feeding said strip through a fixed cutting position, at said position making V-shaped cuts alternately across said strip through both sections and at different angles so as to produce a pair of right and left taps at each cut following the first cut, and feeding said strip between successive cuts a distance equal to the average width of the taps to be produced.

6. A method according to preceding claim 4, in which said strip initially is partially divided lengthwise into two sections from which the respective individual taps of each pair are cut.

7. A method according to preceding claim 4, in which said strip initially is divided lengthwise to such a degree that the taps for each pair will be substantially or wholly separated from each other as soon as each pair is cut from said strip.

8. That improvement in methods of cutting angle sole taps from sole leather, comprising the steps of cutting said leather to produce a strip of a width equal to the over-all width of a pair of right and left taps positioned end to end, and cutting said strip midway between its opposite edges to substantially divide it lengthwise into two sections but leaving small uncut points spaced apart to connect the two sections together so that the strip can be conveniently handled as a single unit.

9. A strip of sole leather of a width equal to the over-all width of a pair of right and left taps positioned edge to edge and partially divided into two parallel sections extending lengthwise of the strip so that by cutting transversely entirely across said strip at suitable angles and at properly spaced intervals, a pair of right and left taps can be severed from said strip at each cut.

PARKER WILLIAMS.